Oct. 26, 1926.

P. HAUSAMANN 1,604,692

SKINNING MACHINE

Filed April 29, 1926

PABLO HAUSAMANN
INVENTOR his ATTY.

Patented Oct. 26, 1926.

1,604,692

UNITED STATES PATENT OFFICE.

PABLO HAUSAMANN, OF BUENOS AIRES, ARGENTINA.

SKINNING MACHINE.

Application filed April 29, 1926. Serial No. 105,493.

The skinning machines at present in use, whilst they may demonstrate the efficiency of the procedure, have, nevertheless one serious defect which, as I shall show further on, I have been able to eliminate in a simple and practical manner.

The defect which I have mentioned consists in the fact that with the exception of its periphery the revolving disc of the machines is enclosed between two covers. This arrangement is such that by the velocity of the wheel or disc, a pressure of air is set up, causing air to penetrate the meat, producing bubbles which spoil the appearance of the meat, and lead to its premature decomposition, all of this involving serious disadvantages and prejudices, seeing that it is a question of an article of food, in which good appearance is of prime importance.

As will be seen later, I have been able to overcome this difficulty by uncovering the skinning disc as much as possible, either by reducing the diameter of the top cover, or by making openings in the bottom one in such a manner that the air has free outlet and is not stored up and compressed at the working point of the disc, where at present it is maintained at a certain pressure on account of the centrifugal force.

In other words, I have diminished the diameter or say the surface of the top cover, and have made some openings distributed in a special manner in the bottom or underneath face of the apparatus, in such a way that the part which moves the disc, whatever may be its position whilst working, with respect to its interposition between the skin and the meat, is always in communication with the air in the neighbourhood, and in no case can form hermetically sealed cavities in which by reason of its velocity the air may be compressed, as I have already said, and penetrate the meat.

The lower face, or say the bottom part, besides the holes made in it for the easy outlet of air, has been rounded off on its right side, which permits of much more perfect and rapid working, whilst on the left side there is a fluting or grooving to give greater firmness or security of support to the thumb of the right hand, by which the apparatus is directed.

Figure 1:
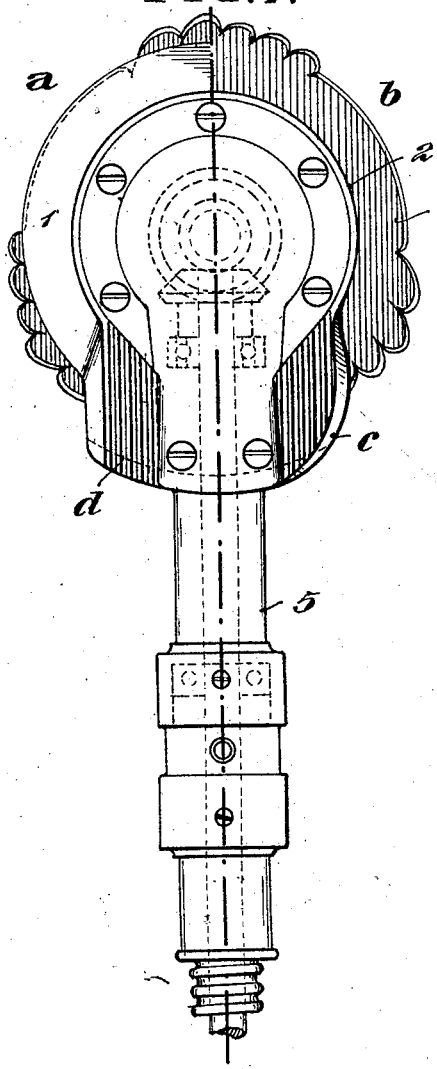

For the better understanding of this description, I attach detailed sketches, in which:

Fig. 1. is a plan of the top part of a machine for skinning animals, improved in accordance with my invention.

Figure 2:
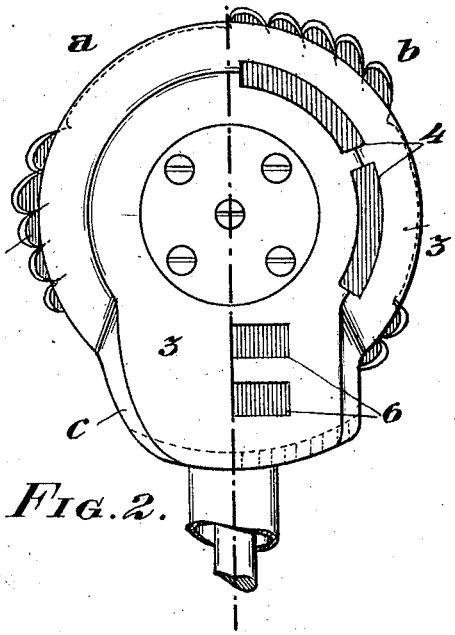

Fig. 2. is a plan of the same machine, seen from its under side.

Figure 3:
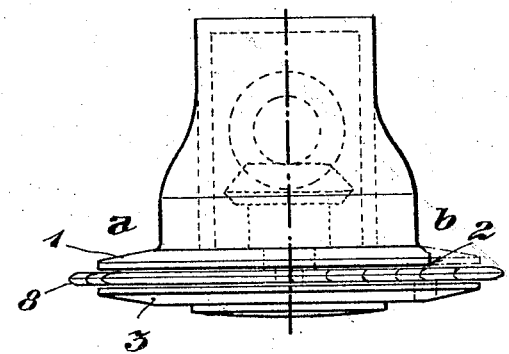

Fig. 3. is a frontal elevation of the machine.

These sketches have been projected in such a manner that the half marked "$a$" corresponds to the ordinary method of construction, and the other half "$b$" to the improved system, to facilitate comparison.

As may be seen from Fig. 1. the diameter of the top cover has been reduced to the line 2.

Further, the left side "$c$" of the lower part of the cover has been rounded, and grooves made at the point "$d$" on which the thumb rests when the machine is in use.

On the other side or face, represented by Fig. 2. there have been made, in the cover 3, the series of openings 4, and in the lower part, or say near the handle 5 one or more perforations 6 have been made, as well as the perforations 7 at the edge of the part next to the handle.

All the above mentioned openings or perforations have for their object that of providing air passage to the space in which the disc 8 revolves, so that the air may have free outlet, and in no case be compressed and obliged to enter the meat, whatever may be the situation of the apparatus with respect to its working position, between the skin and the meat.

It is logical that the reduction of the cover or covers with respect to the revolving discs, and also the form, arrangement and dimensions of the openings made, will depend in each case on the type or constructional system of the apparatus to which these improvements are applied.

The nature of my invention and the manner of putting it into practice having been described and specified, I claim as being my exclusive property and invention:

In a skinning machine of the character described, the combination of a revolving disc, upper and lower cover members embracing the disc, the periphery of the upper cover being substantially inside of that of the disc and having a handle portion provided with side portions, one thereof being rounded at its edge and the other having a grooved surface to accommodate the thumb of the operator, the lower cover member being provided with a series of openings through which communication is established between the outside of the machine and the space in which the disc revolves, whereby air may not be held under compression in the said space by the action of the revolving disc.

In testimony whereof I have signed my name to this specification.

PABLO HAUSAMANN.